C. FOGELBERG.
PROCESS OF PREPARING ZINC FOR ORGAN PIPES AND FOR OTHER PURPOSES.
No. 89,980.             Patented May 11, 1869.
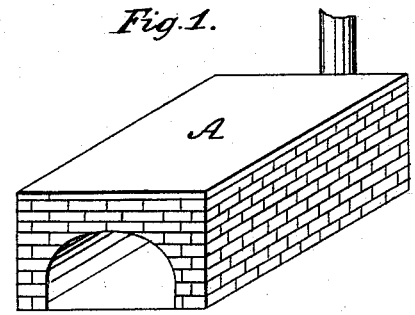
Fig. 1.
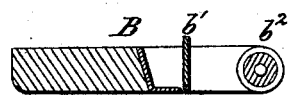
Fig. 2.
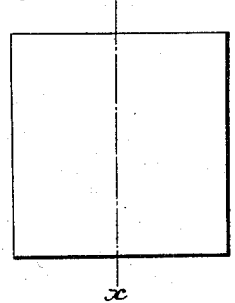 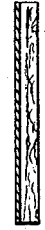
Fig. 3.      Fig. 4.
Witnesses.
A. W. Almqvist
O. Hinchman
Inventor.
C. Fogelberg
per Munn & Co.

United States Patent Office.

CARL FOGELBERG, OF NEW YORK, N. Y.

Letters Patent No. 89,980, dated May 11, 1869.

IMPROVED PROCESS OF PREPARING ZINC FOR ORGAN-PIPES AND FOR OTHER PURPOSES.

The Schedule referred to in these Letters Patent and making part of the same.

*To all whom it may concern:*

Be it known that I, CARL FOGELBERG, of the city, county, and State of New York, have invented a new and useful Improvement in Preparing Zinc for Organ-Pipes and other Purposes; and I do hereby declare that the following is a full, clear, and exact description thereof, which will enable others skilled in the art to make and use the same, reference being had to the accompanying drawings, forming part of this specification, in which—

Figure 1 represents an ordinary furnace, with a flat metallic top.

Figure 2 represents an ordinary "sled" or distributing-apparatus.

Figure 3 represents a sample of prepared zinc-plate.

Figure 4 is a cross-section of the same, taken through the line $x\ x$, fig. 3.

Similar letters of reference indicate corresponding parts.

My invention has for its object to furnish a method for preparing zinc for organ-pipes and various other purposes, in such a way that the zinc will not oxidize, and so that the amount of its expansion and contraction from changes of temperature will be very greatly diminished, while at the same time its softness and firmness will be greatly increased; and It consists in impregnating the zinc with a mixture of lead and tin, as hereinafter more fully described.

The zinc-plate to be operated upon is first wet or brushed over with a solution of sal-ammoniac in water, in about the proportion of one pound of sal-ammoniac to two quarts of water. The zinc-plate is then placed upon the flat metallic top of the furnace A, about the construction of which there is nothing new, and is heated until it becomes glossy, and of a yellow color, when it is ready to receive the lead and tin.

The lead and tin are melted separately, and are then poured into the trough of the "sled" B, about the construction of which there is nothing new.

The sliding gate $b^1$ of the "sled" B is then raised more or less, according as a greater or less quantity of the lead and tin is to be used, and the "sled" B is drawn over the zinc-plate. The melted metals, as they flow out, are spread evenly over the surface of the zinc-plate by the felt-covered roller $b^2$ of the "sled" B.

The zinc being expanded by the heat, as the melted metals are spread over its surface, they penetrate it, the lead permeating its entire mass, but the tin remaining nearer its surface, giving to its surface a gloss and polish, and imparting a firmness to the plate, the lead at the same time giving it softness.

By varying the proportions of the lead and tin, the softness and firmness of the prepared zinc may be varied, as desired. For ordinary purposes a suitable proportion is four and eleven-sixteenth parts of lead and ten and five-sixteenth parts of tin to eighty-five parts of zinc.

If it is desired that both sides of the zinc should be polished, it should be again heated, and the operation repeated upon its other side.

Zinc prepared in this way, having its pores filled with lead and tin while expanded, will be but very little affected by changes of temperature, rendering it very suitable for organ-pipes, roofs, lining sinks, refrigerators, &c., and other purposes where a metal is required that will be only slightly affected by changes of temperature.

Having thus described my invention,

What I claim as new, and desire to secure by Letters Patent, is—

1. Impregnating zinc with lead and tin, either or both, substantially as herein described, and for the purpose set forth.

2. The application of sal-ammoniac to the zinc, preparatory to the application of the melted metal or metals, substantially as herein set forth and described.

CARL FOGELBERG.

Witnesses:
A. W. ALMQVIST,
JAMES T. GRAHAM.